April 2, 1946.  E. M. MOREHOUSE  2,397,680
SNAP-ON CLIP
Filed May 8, 1944  2 Sheets-Sheet 1
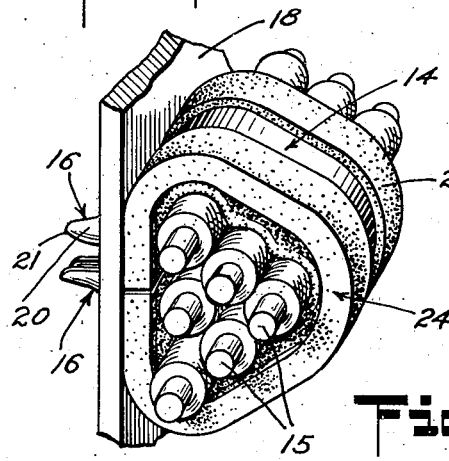
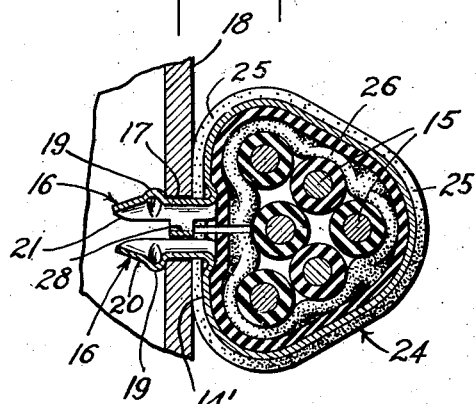
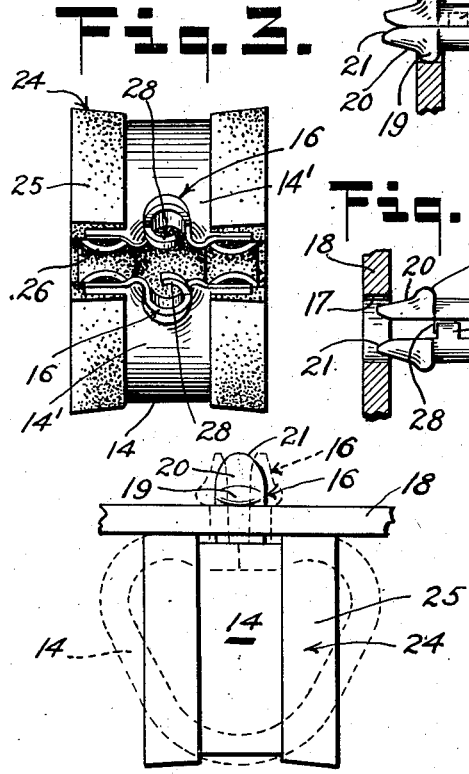
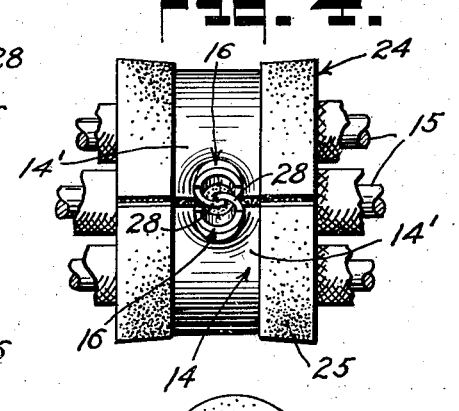
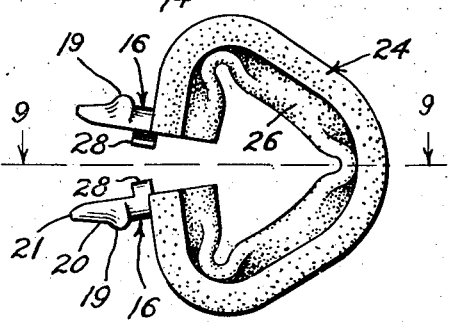
Inventor
EUGENE M. MOREHOUSE
By R. S. Berndt
Attorney

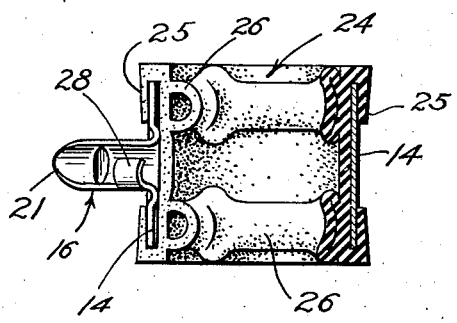
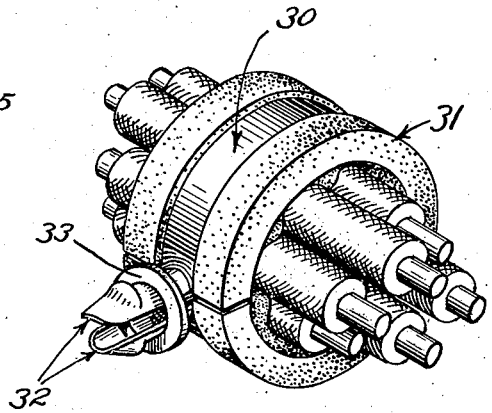
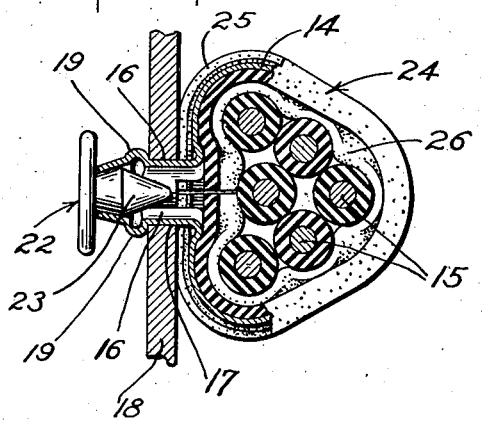
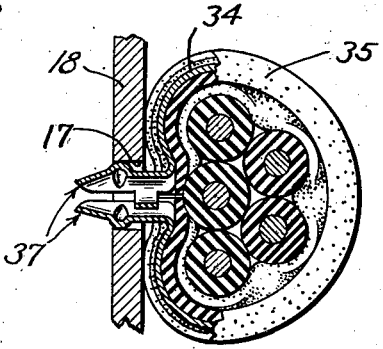
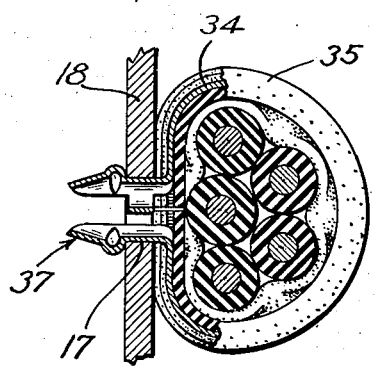

Patented Apr. 2, 1946

2,397,680

UNITED STATES PATENT OFFICE 2,397,680

SNAP ON CLIP

Eugene M. Morehouse, Tujunga, Calif., assignor to Adel Precision Products Corp., a corporation of California Application May 8, 1944, Serial No. 534,675

4 Claims. (Cl. 248—74)

This invention relates to a wire or conduit supporting clips which are adapted to be mounted on a support to maintain the wires or conduit in the desired position, particularly in aircraft where the wire or conduits are subjected to constant jarring and vibratory stresses, and should be securely anchored at closely spaced intervals to the structural parts of the aircraft past and adjacent to which they extend, to protect them against damaging wear and prevent derangement thereof.

An object of this invention is to provide a clip of the character described in which fastening members on the ends thereof are constructed to serve an important dual purpose, viz: the closing and clamping of the clip on the wires or conduit and the fastening of the clip to the support with the clip "locked" in clamping position around the wires or conduit, without the use of screws, bolts, nuts and like extraneous fastenings.

Another object of my invention is to provide a clip of the character described in which an open spring metal wire-embracing loop or band is provided at its ends with outwardly extending snap fastening members which when brought into closely spaced opposed relation to one another serve as a male type snap fastening element and upon being inserted through an opening in a support for the clip will snap apart into a position securely holding the clip on the support against accidental or unintentional dislodgment therefrom, thereby making possible a quick easy labor-saving installation of the clip.

Another object of my invention is to provide a snap such as described in which the ends of the band or loop thereof are provided with interengageable snap hook elements to make possible a quick and easy temporary locking of the clip in clamped position around the wires or conduit preliminary to the fastening of the clip to the support therefor, this locking or temporary holding means also serving to hold the snap fastening members in position to be readily inserted to "snap on" the clip and thus secure it to the support.

A further object is to provide a clip such as described in which the pressure of the wires or conduits therein, that is, the internal pressures, which tend to force the ends of the clip apart including the forces developed by the spring action of the clip, operate to force the snap fastening members into tighter or more effective holding contact with the support whereby a secure fastening of the clip to the support and the maintaining of the clip in the desired position are assured.

A further object is to provide a clip such as described in which the removal thereof from the support may be readily effected by forcing together the snap fastening members and forcibly pulling outwardly on the clip.

Yet another object is to provide a clip such as described in which the snap fastening members are so constructed as to permit of the insertion therebetween of a plug as like locking member after the clip is mounted on the support, to positively prevent withdrawal or removal of the clip from the support, it being necessary to remove such plug or locking member before the clip can be removed from the support.

A further object of my invention is to provide a clip such as described which after being mounted on the support may be turned 360 degrees to dispose it in any position desired while securely held on the support.

A further object of this invention is to provide a clip such as described which readily lends itself to the support of a cushion strip affording a cushioned seat for wires or conduit in a particularly efficacious manner to prevent chafing wear and consequent damage and insuring an effective clamping and holding of groups of wires of varying diameters.

With the foregoing objects in view together with such other objects and advantages as may subsequently appear the invention is carried into effect as illustrated by way of example in the accompanying drawings in which:

Fig. 1 is a perspective view of a clip embodying my invention as installed:

Fig. 2 is a vertical sectional view of the clip as shown in Fig. 1:

Fig. 3 is a front elevation of the clip as it would appear before installation and insertion of the wires therein:

Fig. 4 is a front elevation of the clip as it would appear after the wires are in place and the ends are hooked together in readiness for mounting the clip on the support:

Fig. 5 is a top plan view of the installed clip (wires omitted) showing in dotted lines how it can be turned to desired position while held on the support:

Fig. 6 is a side elevation of the clip as it would appear without the wires therein and when removed from the support:

Figs. 7 and 8 are fragmentary sectional views showing the manner in which the snap fastening members on the clip are inserted through an opening in the support, Fig. 7 showing the start of this operation and Fig. 8 illustrating the snap fastening element as when forced part way through the opening.

Fig. 9 is a horizontal sectional view taken on the line 9—9 of Fig. 6:

Fig. 10 is a perspective view of a modified form of my invention:

Fig. 11 is a part sectional part side elevational view showing a removable plug-like locking member applied to the clip to lock the clip on the support:

Fig. 12 is a part sectional, part elevational view of another modified form of my invention as it would appear before completion of installation thereof:

Fig. 13 is a view corresponding to Fig. 12 showing the clip of Fig. 12 as it would appear when installed on the support therefor:

Referring to the drawings more specifically it is seen that my improved clip generally comprises a spring metal open loop or split band 14 adapted to be closed around a bundle or group of wires 15 or a conduit not shown, and provided at its ends with outwardly projecting, opposed, snap fastening members 16 insertable through an opening 17 in a support 18, which latter for example may be a structural part of an aircraft, to hold the loop or band effectively clamped around the wires or conduit and at the same time securely fasten the clip to the support.

As here shown the opposed outwardly projecting fastening members 16 are formed as integral extensions of the ends of the loop or band 14 and are substantially semi-cylindrical or similarly arcuate in cross section and have their concave sides opposed to provide for desired strength and an easy insertion through the opening in the support. These members 16 are normally spaced apart sufficiently to facilitate placing the wires in the band or applying the band with a snap action around the wires or a conduit, also may be readily forced apart to open the band for an easy placement of wires therein or the placement of the band on the wires or other object to be supported.

At a point intermediate their ends the fastening members 16 are struck or punched outwardly to form arcuate rounded shoulder or humps 19, outwardly from which each of the members 16 is tapered as at 20, to somewhat of a rounded point 21 whereby the members may be easily inserted in the opening 17 of the support 18.

Where the wires are in place in the band 14 the members 16 may be held in close proximity to one another so that they may be inserted through the opening 17 of the support as shown in Figs. 7 and 8. When the humps 19 have been passed through the opening 17 the members 16 will spring apart with a snap action and bring the humps into gripping and tensioned contact with the support 18 around the margin of the opening therein thereby locking the clip on the support and around the wires. This snap on operation of the clip may be quickly and easily carried out and is particularly advantageous for this reason and because extraneous fastenings such as bolts, nuts, screws and the like are not required.

Removal of the clip may be effected by forcing the opposed ends of the members 16 together and forcibly pulling them out of the opening 17 whereupon the clip will spring open for placement or removal of wires.

If desired the clip may be locked in place on the support as shown in Fig. 11, by inserting a plug member between the protruding ends of members 16, such as the headed member 22 shaped somewhat like a collar button with an enlargement 23 between its end so that it will be held between the converging outer end portions of said members 16. This locking member 22 is forced in place by an inward movement in relation to the outwardly projecting members 16 with a snap action and may be removed by means of a suitable tool when desired. When in place, it positively locks the members 16 against releasing movement.

The members 16 when in locking position, due to their semi-cylindrical form, provide a pivot permitting the clip to be turned through 360 degrees in either direction as indicated in Fig. 5 whereby the clip may be disposed in various position as desired without being removed from the support and while locked thereon.

As here provided the band 16 is completely lined by means of a cushion strip 24 of elastic and soft rubber or the like to protect the wires against chafing and wear and afford other advantages which will be hereinafter pointed out. It should be noted however, that the cushion strip may be omitted where a cushioning action is not deemed necessary and the clip otherwise, will provide the advantages herein set forth in a particularly efficacious manner.

The cushion 24 is provided with rebent flanges 25 which will grip the side edges and overlie the outer surface of the band 8 to hold the cushion on the band. Tubular, flexible and deformable ribs 26 are formed on the cushion to make possible an effective cushion action with relatively thin cushioning material, and provide for accommodation of bundles of wires or of conduits of varying diameters.

As here shown the band 14 is provided with substantially straight or flat bearing portions 14' adjacent its ends, disposed to abut the support 18 as shown in Fig. 2. Portions of the rebent flanges 25 overlie the flat bearing portions 14' as shown in Figs. 1 and 2 thereby providing cushions between said flat portions and the support 18 so that the metal band does not necessarily contact the support. These cushioning portions of the flanges 25 are compressed and exert a force urging the humps 19 on members 16 into tensioned and holding contact with the support 18.

The band 14 may as here provided be polygonal instead of the usual circular form, with an apical portion opposite the ends and members 16 whereby it may be more easily handled and held in proper position to be snapped into place on the support due to the flat portions and plane surfaces afforded by such formation. However it is obvious that the band may be circular as shown in Fig. 10 or of any shape provided it will embrace and hold the wires and afford the fastening thereof to the support by means of the members 16.

An important provision of my invention is a temporary latching, hooking or holding means embodied in simple form in the snap fastening members so that the latter may be quickly pressed together and hooked to one another to hold the band in the desired position on the wires as well as hold the members 16 close together for ready insertion through the opening 17 in the support 18.

As here shown (see Figs. 3 and 6) the fastening members 16 are provided with oppositely facing rounded or curved hooks 28 formed integral therewith at points inwardly spaced from the humps 19. Looking at Fig. 3 it is seen that the upper member 16 has the hook on the left side thereof and the lower member 16 has the hook on its right side. It is now apparent that when the members 16 are forced together to close the band 14 around the wires the hooks 28 will snap past one another due to the rounded form or curvature thereof and automatically come into hooked engagement as best shown in Fig. 4 thereby holding the members 16 together in readiness to be inserted through the opening 17 in the support 18 and clamping the band around the wires.

When the tapered portions 20 of the members 16 are passed into the opening 17 of the support, the members 16 are forced together as will be apparent in Fig. 7, and come closer together as the humps 19 pass into and through the opening as seen in Fig. 8. The hooks 28 permit of this action and also permit the members 16 to spring or snap into their locking position shown in Fig. 2 when the humps are moved through said opening. Should it be desired to open the clip after being temporarily hooked as shown in Fig. 4 this can be accomplished readily by pushing the members 16 slightly toward one another and forcing one of said members to one side or out of alignment with the other one to disengage the hooks.

In Fig. 10 I have shown a modified form of my invention wherein the split band 30 is circular and lined with a cushion 31. This band is provided at its ends with integral snap fastening members 32 identical with members 16 in the previously described form of my invention except that the hooks are omitted therefrom. Instead of the hooks, I propose to use slip-over locking annular or washer-like members 33 to hold the band pre-assembled on the wires in the same manner as where the hooks are employed. This member 33 may be quickly and easily mounted in place and removed but will remain on the snap fastening members 32 like a washer when the clip is installed on the support therefor.

Figs. 12 and 13 illustrate another modification of the invention wherein an open spring metal band 34 having a cushion 35, is formed with convex bearing portions adjacent its ends so that when the fastening members 37 which are identical with members 16, are inserted as shown in Fig. 12 into the opening 17 in support 18 said convex portions 37 will bear against the support and on pushing the portions 37 into locking position will flatten out as shown in Fig. 13. This arrangement will insure a tensioned locking contact of members 37 with the supports, where the supports are of varying thicknesses and is especially desirable where the clip is secured to a thin support.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a wire conduit supporting clip, a spring metal open band for embracing wires or a conduit, having normally spaced apart end portions, and complementary snap fastening members projecting outwardly from the end portions of the band for extension through an opening in a support for the clip, said band being tensioned so that its ends and said members are normally spaced apart to provide for the mounting of the wires or conduit within the band and are movable toward one another so that the band will be closed and the fastening members will be disposed for simultaneous insertion through said opening, and locking projections on said fastening member for contacting the support to lock the clip thereon when the fastening members are inserted through the opening, and means forming parts of said fastening members and operable when said fastening members are brought into band closing position preliminary to insertion thereof through said opening, for locking said fastening members against springing back into their normal position.

2. In a wire conduit supporting clip, a spring metal open band for embracing wires or a conduit, having normally spaced apart end portions, and complementary snap fastening members projecting outwardly from the end portions of the band for extension through an opening in a support for the clip, said band being tensioned so that its ends and said members are normally spaced apart to provide for the mounting of the wires or conduit within the band and are movable toward one another so that the band will be closed and the fastening members will be disposed for simultaneous insertion through said opening, and locking projections on said fastening member for contacting the support to lock the clip thereon when the fastening members are inserted through the opening, and opposite facing hooks on said members operable upon the movement of said member into band closing position and before insertion through said opening, to hook said members together.

3. In a wire conduit supporting clip, a spring metal open band for embracing wires or a conduit, having normally spaced apart end portions, and complementary snap fastening members projecting outwardly from the end portions of the band for extension through an opening in a support for the clip, said band being tensioned so that its ends and said members are normally spaced apart to provide for the mounting of the wires or conduit within the band and are movable toward one another so that the band will be closed and the fastening members will be disposed for simultaneous insertion through said opening, and locking projections on said fastening members for contacting the support to lock the clip thereon when the fastening members are inserted through the opening, and hooks operable when said fastening members are brought into band closing position preliminary to insertion thereof through said opening, for locking said fastening members against springing back into their normal position, and said fastening members having arcuate inner portions which are extended in an edgewise manner to form said hooks.

4. In a wire conduit supporting clip, a spring metal open band for embracing wires or a conduit, having normally spaced apart end portions, and complementary snap fastening members projecting outwardly from the end portions of the band for extension through an opening in a support for the clip, said band being tensioned so that its ends and said members are normally spaced apart to provide for the mounting of the wires or conduit within the band and are movable toward one another so that the band will be closed and the fastening members will be disposed for simultaneous insertion through said opening, and locking projections on said fastening member for contacting the support to lock the clip thereon when the fastening members are inserted through the opening, and a removable locking plug insertable between the outer ends of said fastening members by an inward movement after they have been inserted through said opening to prevent said members from being moved out of position in which said projections lockingly contact said support, said fastening members having converging outer end portions and said plug having an enlargement gripped between said end portions to hold the plug in place between them.

EUGENE M. MOREHOUSE.